(12) United States Patent
Ota et al.

(10) Patent No.: US 8,000,040 B2
(45) Date of Patent: Aug. 16, 2011

(54) IMAGING LENS, MANUFACTURING METHOD THEREOF, AND COMPOUND LENS

(75) Inventors: Satoru Ota, Osaka (JP); Yutaka Ueta, Yao (JP); Youhei Nakagawa, Neyagawa (JP); Yuma Aoi, Hirakata (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 31 days.

(21) Appl. No.: 12/058,796

(22) Filed: Mar. 31, 2008

(65) Prior Publication Data

US 2008/0239512 A1 Oct. 2, 2008

(30) Foreign Application Priority Data

Mar. 29, 2007 (JP) .................................. 2007-088311
Jan. 21, 2008 (JP) .................................. 2008-010596

(51) Int. Cl.
G02B 9/00 (2006.01)
G02B 13/00 (2006.01)
G02B 9/12 (2006.01)
G02B 9/04 (2006.01)

(52) U.S. Cl. ........ 359/796; 359/724; 359/900; 359/793; 359/784; 359/642

(58) Field of Classification Search .................. 359/724, 359/796, 719, 717, 741–743, 708, 362, 642, 359/900, 718, 793, 784; 264/1.1–2.7; G02B 11/02

See application file for complete search history.

(56) References Cited

U.S. PATENT DOCUMENTS

| | | | | |
|---|---|---|---|---|
| 4,662,717 A | * | 5/1987 | Yamada et al. | 359/362 |
| 5,986,818 A | * | 11/1999 | Hashimura | 359/708 |
| 6,551,530 B2 | * | 4/2003 | Koizumi et al. | 264/1.7 |
| 7,149,040 B2 | * | 12/2006 | Bloemen et al. | 359/719 |
| 7,165,840 B2 | * | 1/2007 | Yokoyama et al. | 351/177 |
| 7,499,220 B2 | * | 3/2009 | Togashi et al. | 359/642 |
| 7,529,044 B2 | * | 5/2009 | Matsumoto et al. | 359/811 |
| 2005/0249464 A1 | * | 11/2005 | Case et al. | 385/52 |
| 2006/0012889 A1 | | 1/2006 | Kojima et al. | |

FOREIGN PATENT DOCUMENTS

JP 2005-345713 A 12/2005
KR 1020060015519 A 2/2006

OTHER PUBLICATIONS

Korean Office Action dated Dec. 8, 2010, issued in corresponding Korean Patent Application No. 10-2008-0017340.
Chinese Office Action dated Feb. 24, 2011, issued in corresponding Chinese Patent Application No. 200810087888.1.

* cited by examiner

*Primary Examiner* — Darryl J Collins
*Assistant Examiner* — Zachary Wilkes
(74) *Attorney, Agent, or Firm* — Westerman, Hattori, Daniels & Adrian, LLP

(57) ABSTRACT

In an imaging lens, one compound lens and two single lenses are arranged in a lens barrel. On the light output side of the lens barrel, a filter is arranged with a distance from lens barrel. With a further distance from the filter, an imaging element is arranged. In the compound lens, a resin lens is bonded to a base member lens, having an output surface center of the resin lens displaced by a prescribed amount relative to an output surface center of the base member lens, so that a transmission decentration amount attributed to the base member lens, not including the resin lens, and the single lenses is cancelled by a transmission decentration amount by the resin lens when taken as a whole lens system. Thus, the imaging lens capable of suppressing reduction in resolving power due to transmission decentration of the lenses is obtained.

17 Claims, 21 Drawing Sheets

IMAGING LENS, MANUFACTURING METHOD THEREOF, AND COMPOUND LENS

BACKGROUND OF THE INVENTION

1. Field of the Invention

The present invention relates to an imaging lens, a manufacturing method thereof, and a compound lens. In particular, the present invention relates to an imaging lens having a plurality of lens including a compound lens, a manufacturing method of such an imaging lens, and the compound lens.

2. Description of the Background Art

Recently, an imaging lens for a camera incorporated in a mobile phone, a digital camera or the like, is required to be reduced in size, weight and costs. In such an imaging lens, for example, as shown in FIG. 40, a plurality of lenses 103, 105, 106 are arranged in lens barrel 107. On the light-output side of lens barrel 107, a filter 108 and an imaging element 109 are arranged in order.

Particularly as to the imaging lens for the mobile phone camera, a plastic lens is employed for achieving reduction in weight and costs, as proposed in Japanese Patent Laying-Open No. 2005-345713, for example. There has also been an attempt to employ a compound lens in which a resin lens is bonded to the surface of a plastic lens, so that the total length of the mobile phone camera is reduced and the resolving power is improved.

However, there has been the following problem with a conventional imaging lens. Generally, a plastic lens is formed by molding or the like. In the plastic lens formed by molding or the like, the position of the center of an input-side lens surface (the incident surface center) and that of the center of an output-side lens surface (the output surface center) of the plastic lens not always agree with (positioned at) a prescribed axis in the plastic lens taken out from the mold, such as a center axis for the contour (the contour center axis).

Accordingly, in a state where lenses 103, 105, 106 are assembled in lens barrel 107, lines 121, 122, 123 respectively connecting incident surface centers and output surface centers of lenses 103, 105, 106 may be decentered relative to a barrel center axis 112 of lens barrel 107, resulting in transmission decentration (line 124) taken as a whole lens system. As a result, the light transmitted through lenses 103, 105, 106 does not excellently form an image at imaging element 109, and resolving power is reduced or blurs occur in half of the image.

It is to be noted that, line 121 is a line connecting incident surface center 133a of incident surface 103a and output surface center 133b of output surface 103b of lens 103, line 122 is a line connecting incident surface center 144a of incident surface 105a and output surface center 144b of output surface 105b of lens 105, and line 123 is a line connecting incident surface center 155a of incident surface 106a and output surface center 155b of output surface 106b of lens 106.

SUMMARY OF THE INVENTION

The present invention has been made to solve the above-described problem, and an object thereof is to provide an imaging lens suppressing reduction in resolving power due to transmission decentration of a lens. Another object of the present invention is to provide a manufacturing method of such an imaging lens. Still another object of the present invention is to provide a compound lens suitable for such an imaging lens and manufacturing method thereof.

The present invention is directed to an imaging lens having a plurality of lenses, including a first lens and a second lens. In the first lens, a resin lens is bonded to a base member lens. The second lens is arranged according to a prescribed positional relationship between the first lens. In the first lens, the resin lens is bonded to the base member lens, having an output surface center of the resin lens and an output surface center of the base member lens displaced from each other by a prescribed amount, so that a transmission decentration amount attributed to the base member lens, before having the resin lens bonded thereto, and the second lens is cancelled by a transmission decentration amount by the resin lens when taken as a whole lens system including the first lens and the second lens.

With such a configuration, a transmission decentration amount attributed to the base member lens, before having the resin lens bonded thereto, and the second lens is cancelled by a transmission decentration amount by the resin lens, which is bonded to the base member lens, having an output surface center of the resin lens and an output surface center of the base member lens displaced from each other by a prescribed amount, when taken as a whole lens system including the first lens and the second lens. Thus, reduction in resolving power of the imaging lens can be suppressed.

For checking the positional displacement amount, preferably, the resin lens is provided with a prescribed first marker around the output surface center, and the base member lens is provided with a prescribed second marker around the output surface center.

Specifically, it is preferable that the first and second markers are each an annular convex or concave portion.

The present invention is directed to a manufacturing method of an imaging lens having at least a first lens and a second lens arranged, in which the first lens is formed by bonding a resin lens to a base member lens. The method includes the steps of obtaining a prescribed positional displacement amount between an output surface center of the resin lens and an output surface center of the base member lens, so that a transmission decentration amount attributed to the base member lens, before having the resin lens bonded thereto, and the second lens is cancelled by a transmission decentration amount by the resin lens when taken as a whole lens system including the first lens and the second lens; forming the first lens by bonding the resin lens to an output surface of the base member lens based on the obtained positional displacement amount; and arranging the first lens and the second lens according to a prescribed positional relationship.

With such a method, by bonding the resin lens to the base member lens having the output surface center of the resin lens and the output surface center of the base member lens displaced by a prescribed amount, a transmission decentration amount attributed to the base member lens, before having the resin lens bonded thereto, and the second lens is cancelled by a transmission decentration amount by the resin lens when taken as a whole lens system including the first lens and the second lens. Thus, reduction in resolving power of the imaging lens can be suppressed.

Specifically, as to the step of obtaining the prescribed positional displacement amount, there is a scheme of obtaining the prescribed positional displacement amount based on a positional displacement amount for each of the incident surface center and the output surface center of each of the base member lens and the second lens relative to a contour center axis of the base member lens and the second lens.

Also, there is a scheme of obtaining the prescribed positional displacement amount in which a transmission decentration amount in a state where the base member lens and the second lens are arranged in a lens barrel for arranging the first lens and the second lens is obtained, and the prescribed positional displacement amount is obtained so that the obtained transmission decentration amount is cancelled.

Specifically, in order to form the first lens based on the obtained positional displacement amount, it is preferable that a lens holding portion for holding the base member lens and a mold for molding the resin lens are relatively displaced from each other in a horizontal direction based on the obtained positional displacement amount, and the resin lens is bonded to the output surface of the base member lens.

More specifically, the step of forming the first lens may include the steps of: holding the base member lens in a prescribed orientation relative to the lens holding portion; after relatively displacing the lens holding portion and the mold from each other in the horizontal direction, injecting resin to be the resin lens into the mold; placing the base member lens, held by the lens holding portion in a state where a relative positional relationship in the horizontal direction is maintained, on the mold and allowing the base member lens to contact the resin; and bonding the resin lens to the base member lens by curing the resin.

Alternatively, the step of forming the first lens may include the steps of: relatively displacing the lens holding portion and the mold from each other in the horizontal direction, and injecting resin to be the resin lens into the mold; placing the base member lens on the mold and allowing the base member lens to contact the resin; holding the base member lens in a prescribed orientation by the lens holding portion; and bonding the resin lens to the base member lens by curing the resin.

Preferably, resin of ultraviolet-curing type is employed as the resin. In the step of forming the first lens, the resin is cured by irradiating the resin with ultraviolet rays.

The present invention is directed to a compound lens in which a resin lens is bonded to a base member lens. The compound lens includes the resin lens and the base member lens. The resin lens has a first incident surface and a first output surface, and a prescribed first marker is formed on at least one surface of the first incident surface and the first output surface. The base member lens has a second incident surface and a second output surface and has the resin lens bonded thereto. A prescribed second marker is formed on at least one surface of the second incident surface and the second output surface.

With such a configuration, as the first marker is formed on the resin lens and the second marker is formed on the base member lens, the positional displacement amount between the resin lens and the base member lens can easily be checked.

Specifically, the first marker is formed at a center of the one surface, or around the center of the one surface, of the resin lens. The second marker is formed around the center of the at least one surface of the base member lens.

More specifically, the first and the second markers are each an annular convex or concave portion.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
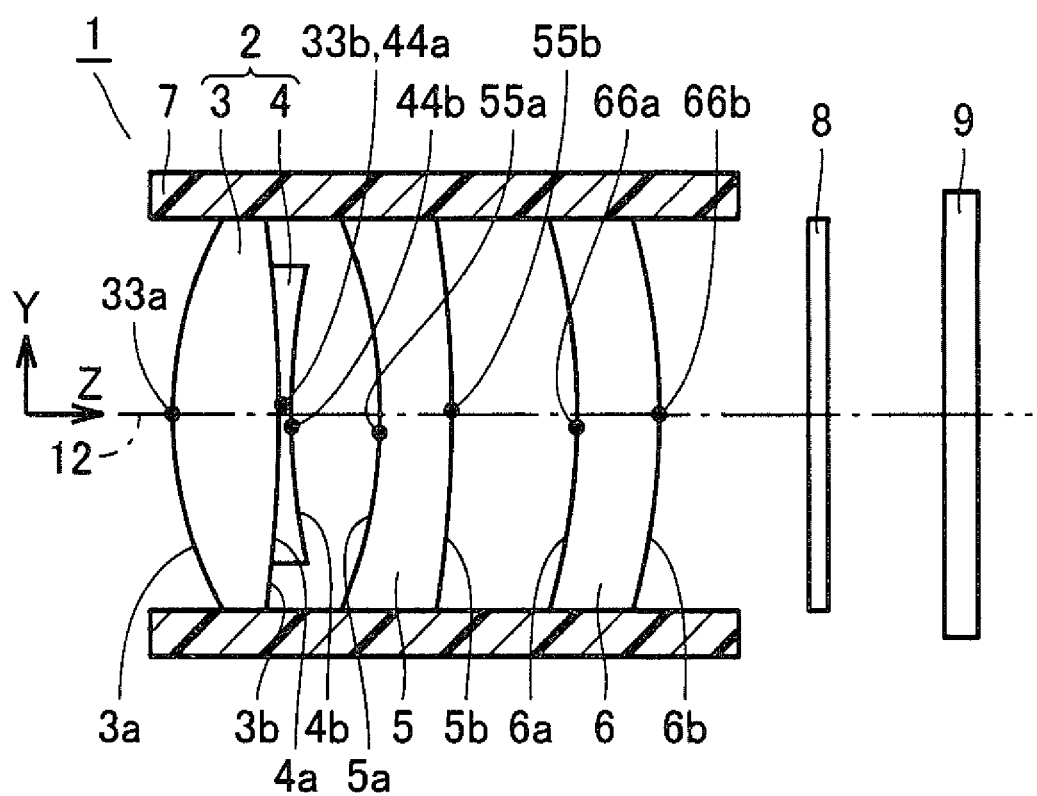
FIG. 1 is a cross-sectional view of an imaging lens according to a first embodiment of the present invention.

An imaging lens and a manufacturing method thereof according to a first embodiment of the present invention is described. As shown in FIG. 1, in an imaging lens 1, one compound lens 2 and two single lenses 5, 6 are arranged in a lens barrel 7. On the light output side of lens barrel 7, a filter 8 is arranged with a distance from lens barrel 7. With a further distance from filter 8, an imaging element 9 is arranged.

Compound lens 2 is formed by a base member lens 3 and a resin lens 4. Resin lens 4 is bonded to an output-side lens surface of base member lens 3. Base member lens 3 has a function of, for example, collecting light, while resin lens 4 has functions of attaining achromatism and reducing spherical aberration and the like. Single lenses 5, 6 have a function of reducing various aberrations such as astigmatism. In order for respective functions to be fully achieved, compound lens 2 and single lenses 5, 6 have their respective lens surfaces shaped in a prescribed spheric or aspheric surface.

As will be detailed later, in present imaging lens 1, the center (output surface center 44b) position of the output-side lens surface (output surface 4b) of resin lens 4 and the center (output surface center 33b) position of output surface 3b of base member lens 3 are displaced from each other by a prescribed amount, so that a transmission decentration amount attributed to base member lens 3, before having resin lens 4 bonded thereto, and the other single lenses 5, 6 is cancelled by a transmission decentration amount by resin lens 4, in a state where resin lens 4 is bonded to base member lens 3 and thereafter the resulting bonded compound lens 2 is arranged together with single lenses 5, 6 in lens barrel 7, when taken as a whole lens system including compound lens 2 and single lenses 5, 6 (see FIG. 17).

That is, resin lens 4 is bonded to base member lens 3 having its output surface center 44b displaced by a prescribed amount relative to output surface center 33b of base member lens 3, so that the transmission decentration amount attributed to base member lens 3, not including resin lens 4, and single lenses 5, 6 are cancelled by the transmission decentration amount by resin lens 4 when taken as a whole lens system. As used herein, a transmission decentration amount refers to a positional displacement amount from an optical axis of a position where light transmitted through one lens, or a plurality of lenses (a lens module), forms an image.

Figure 2:
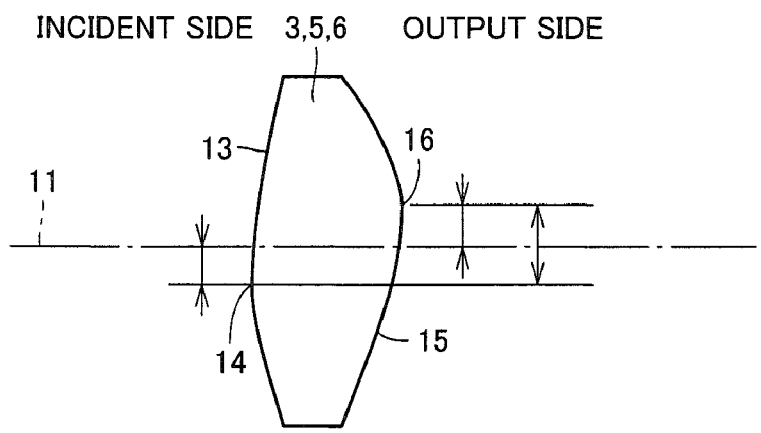
FIG. 2 is a cross-sectional view used for describing an incident surface center and an output surface center relative to a contour center axis in the present embodiment.

Next, one example of a manufacturing method of above-described imaging lens 1 is described. First, using a decentration measuring device, as shown in FIG. 2, for each of base member lens 3 and single lenses 5, 6, a positional displacement amount for each of incident surface center 14 of incident surface 13 and output surface center 16 of output surface 15 relative to a center axis for the contour of each lens (contour center axis 11) is measured. As used herein, a contour refers to the rim of each lens. A contour center axis refers to an axis that passes through the center of a circle along the rim of each lens.

Figure 3:
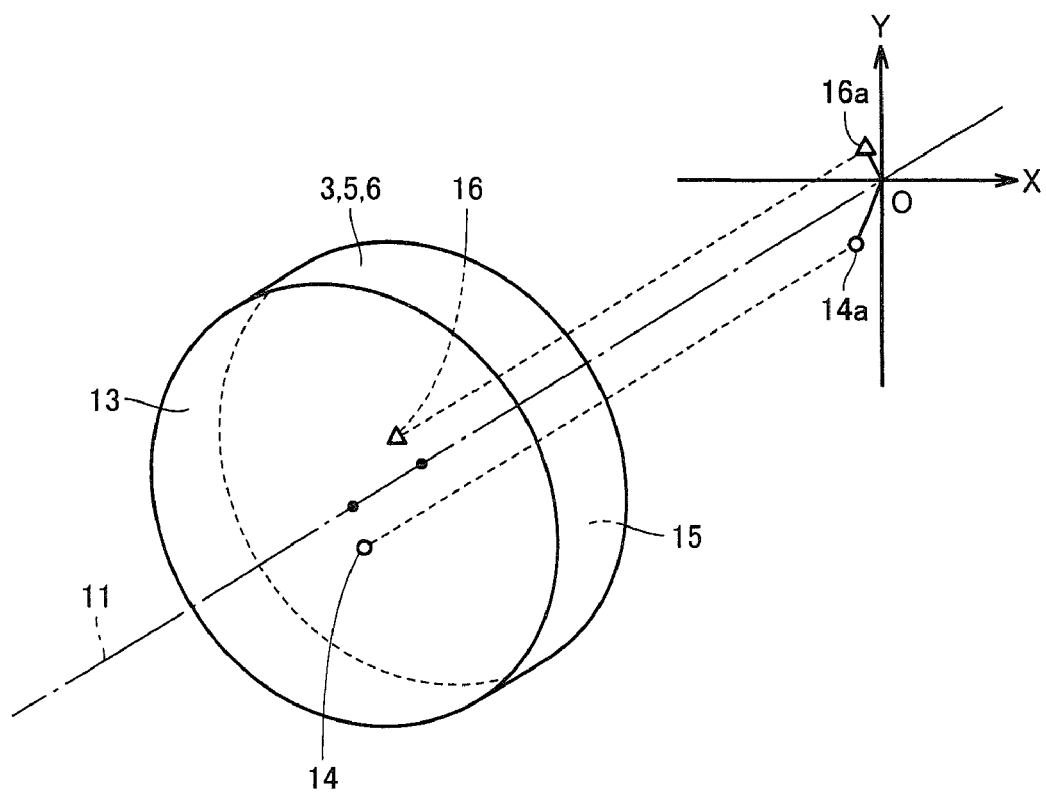
FIG. 3 is a perspective view used for describing a positional displacement amount of the incident surface center or the output surface center relative to the contour center axis in the present embodiment.

The positional displacement amount is described in further detail. An X-Y plane perpendicular to contour center axis 11 as shown in FIG. 3 is discussed, in which a point at which contour center axis 11 crosses the plane is origin O. Assuming that a position where a line passing incident surface center 14 and being parallel to contour center axis 11 crosses the X-Y plane is position 14a, and a position where a line passing output surface center 16 and being parallel to contour center axis 11 crosses the X-Y plane is position 16a, the positional displacement amount between incident surface center 14 and contour center axis 11 can be obtained as the distance between position 14a and origin O. The positional displacement amount between output surface center 16 and contour center axis 11 can be determined as the distance between origin O and position 16a.

Next, based on the obtained respective positional displacement amounts of incident surface center 14 and output surface center 16 of each of base member lens 3 and single lenses 5, 6 relative to contour center axis 11, a positional displacement amount T (a distance in the X-Y plane) is obtained by an optical calculation. Positional displacement amount T is a positional displacement amount by which output plane center 44b of resin lens 4 is displaced relative to output surface center 33b of base member lens 3 so that the transmission decentration amount attributed to base member lens 3 and single lenses 5, 6 is cancelled in a state where the resin lens is bonded to the base member lens and becoming compound lens 2 and thereafter arranged together with single lenses 5, 6 in lens barrel 7 (when taken as a whole lens system). Here, the circumferential direction position of each of compound lens 2 and single lenses 5, 6 is also obtained.

Figure 4:
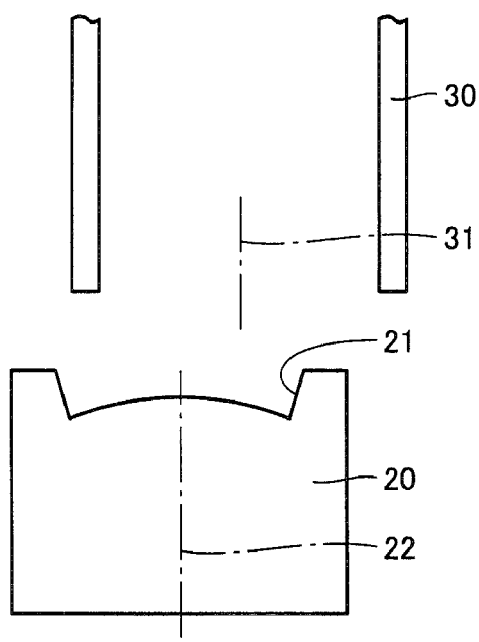
FIG. 4 is a cross-sectional view showing one step for manufacturing a reference compound lens according to a manufacturing method of the imaging lens shown in FIG. 1.
Figure 5:
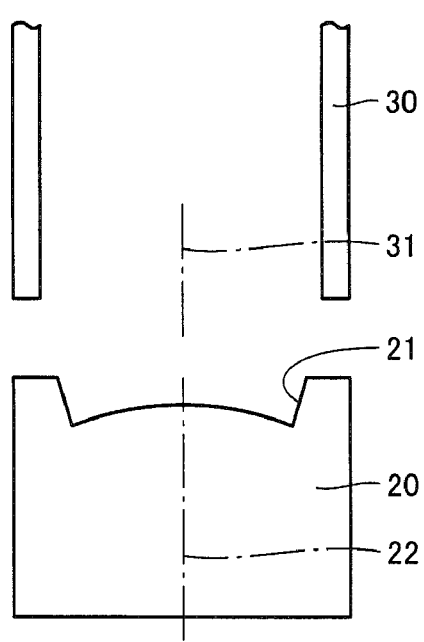
FIG. 5 is a cross-sectional view showing a step performed after the step shown in FIG. 4 in the present embodiment.

Next, in order to take into account of a manufacture tolerance when molding and bonding the resin lens onto the base member lens, a reference compound lens is produced. First, as shown in FIGS. 4 and 5, center axis 22 of a mold 20 for molding the resin lens and center axis 31 of a lens holding portion 30 for holding the base member lens are aligned with each other, for example by sliding mold 20 relative to lens holding portion 30. Mold 20 is provided with a concave portion 21 into which prescribed resin to be the resin lens is injected.

Figure 6:
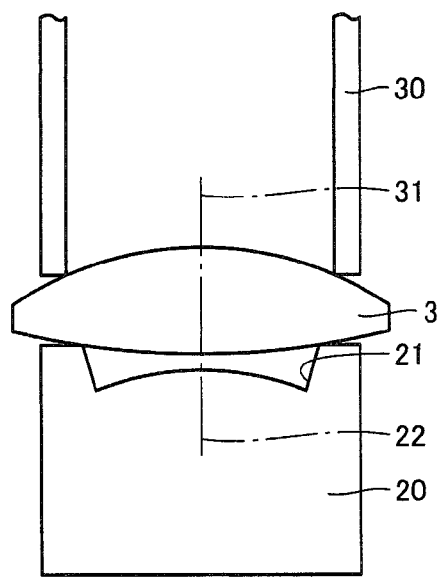
FIG. 6 is a cross-sectional view showing a step performed after the step shown in FIG. 5 in the present embodiment.

Next, as shown in FIG. 6, base member lens 3 is placed on mold 20, having its lens surface to which the resin lens is to be bonded faced downward. By lowering lens holding portion 30 so that the tip portion thereof contacts base member lens 3, base member lens 3 is held in a prescribed orientation relative to lens holding portion 30.

Figure 7:
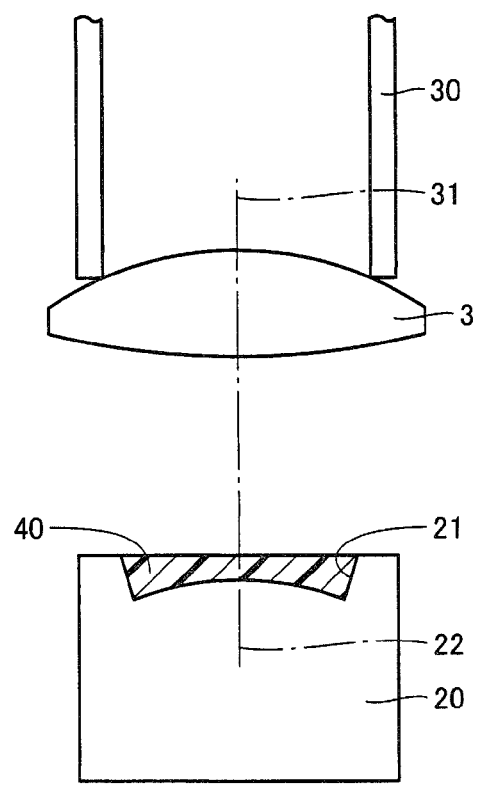
FIG. 7 is a cross-sectional view showing a step performed after the step shown in FIG. 6 in the present embodiment.
Figure 8:
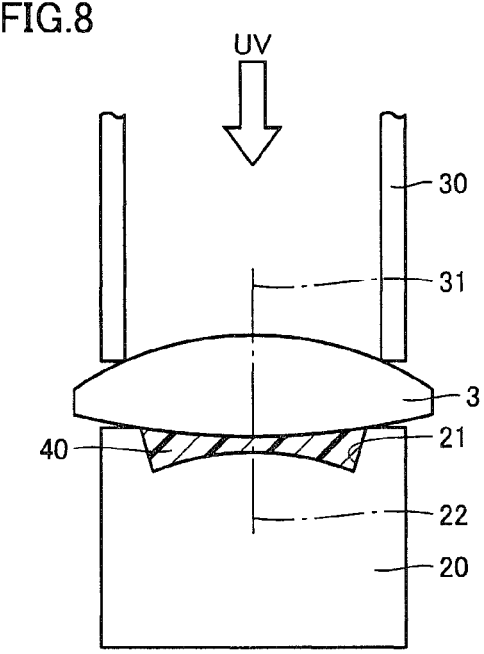
FIG. 8 is a cross-sectional view showing a step performed after the step shown in FIG. 7 in the present embodiment.
Figure 9:
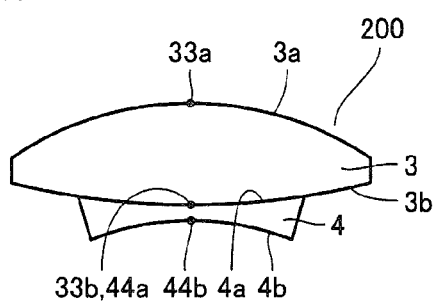
FIG. 9 is a cross-sectional view showing a step performed after the step shown in FIG. 8 in the present embodiment.

Next, as shown in FIG. 7, in a state where base member lens 3 is held by lens holding portion 30, lens holding portion 30 is raised. Next, resin 40 of ultraviolet-curing type is injected into concave portion 21 of mold 20. Next, lens holding portion 30 is lowered to place base member lens 3 on mold 20, allowing a prescribed lens surface of base member lens 3 to contact resin 40. Next, as shown in FIG. 8, resin 40 is irradiated with ultraviolet rays and thereby cured. After resin 40 is cured, the resin lens is taken out of mold 20. Thus, as shown in FIG. 9, reference compound lens 200 in which resin lens 4 is bonded to base member lens 3 is completed.

Figure 10:
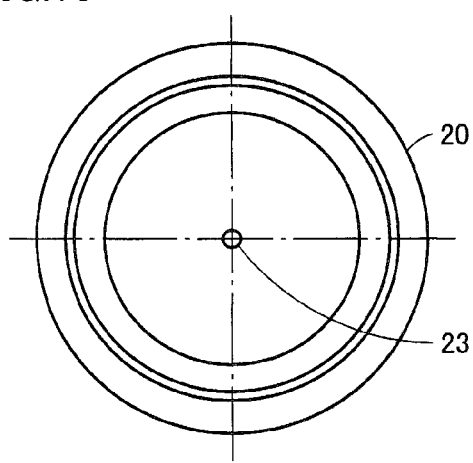
FIG. 10 is a top view used for describing the structure of a mold in the present embodiment.

Next, a positional displacement amount of the center position of the lens surface of the completed reference compound lens 200 is measured. As shown in FIG. 10, in advance, concave portion 21 of mold 20 for molding the resin lens is provided with a marker 23 for imprinting on the resin lens. As marker 23, a grinding mark can be utilized, which will be left in a concentric manner in the mold when concave portion 21 is formed by grinding. The center of the concentric grinding mark is regarded as the center axis of mold 20. Thus, on the output surface of the molded resin lens, a marker 4c corresponding to marker 23 is imprinted. The center of marker 4c serves as output surface center 44b (see FIG. 12).

Figure 11:
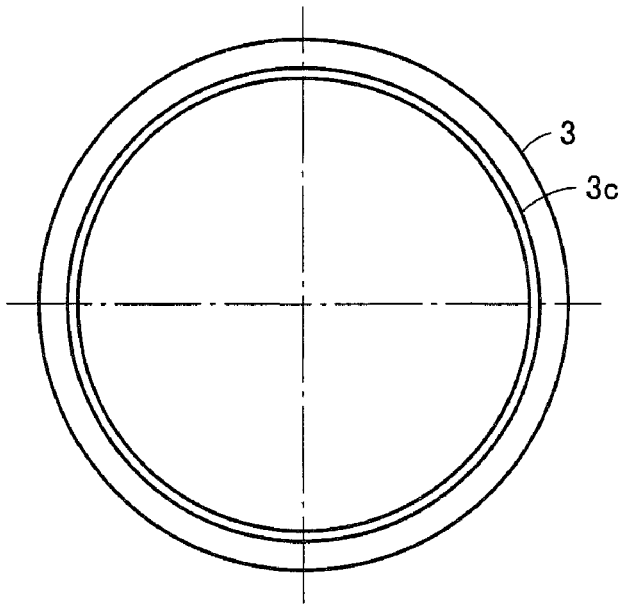
FIG. 11 is a plan view used for describing the structure of the base member lens in the present embodiment.

On the other hand, as to the base member lens also, as shown in FIG. 11, a marker 3c is formed at the rim portion of base member lens 3 by a marker formed concentrically in a mold (not shown) for molding the base member lens. The center of concentric marker 23 serves as output surface center 33b of output surface 3b of base member lens 3 (see FIG. 12). It is to be noted that markers 4c, 3c may be a convex or concave shape. In particular, marker 3c formed on base member lens 3 is preferably formed in an external region to the effective diameter of the lens.

Figure 12:
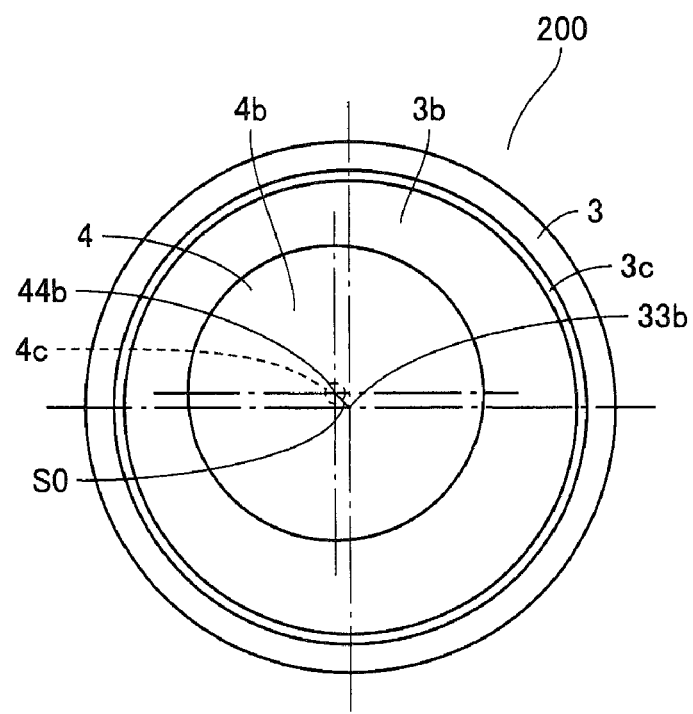
FIG. 12 is a plan view showing a step performed after the step shown in FIG. 9 in the present embodiment.

Thus, as shown in FIG. 12, in reference compound lens 200, a positional displacement amount SO (distance) between output surface center 33b of base member lens 3 and output surface center 44b of resin lens 4 is measured. It is to be noted that positional displacement amount SO is exaggerated in FIG. 12 for the purpose of illustration.

Next, an actual positional displacement amount between lens holding portion 30 and mold 20 for attaining positional displacement amount T is obtained. Specifically, a positional displacement amount S1 by which center axis 22 of mold 20 and center axis 31 of lens holding portion 30 should actually be relatively displaced from each other is obtained based on positional displacement amount SO between output surface center 33b of base member lens 3 and output surface center 44b of resin lens 4 in a state where center axis 22 of mold 20 and center axis 31 of lens holding portion 30 agree with each other, in order to attain the calculated positional displacement amount T between output surface center of base member lens 3 and the output surface center of resin lens 4.

Figure 13:
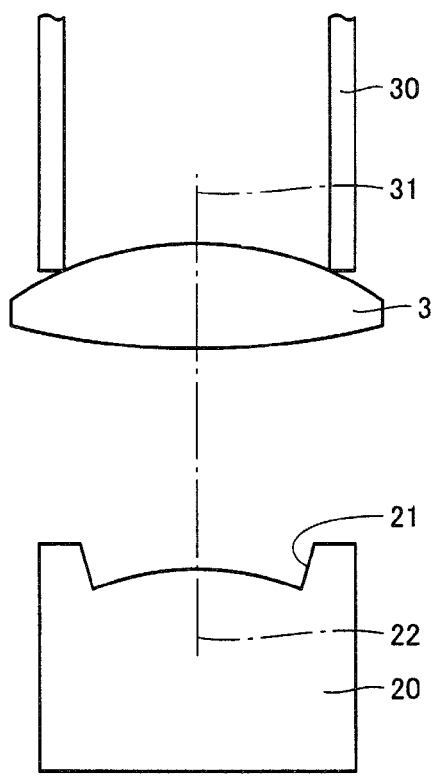
FIG. 13 is a cross-sectional view showing a step performed after the step shown in FIG. 12 in the present embodiment.

Next, based on the obtained positional displacement amount S1, a compound lens is produced. First, through the similar steps described above referring to FIGS. 4-7, as shown in FIG. 13, in a state where center axis 22 of mold 20 and center axis 31 of lens holding portion 30 agree with each other, base member lens 3 is held in a prescribed orientation relative to lens holding portion 30.

Figure 14:
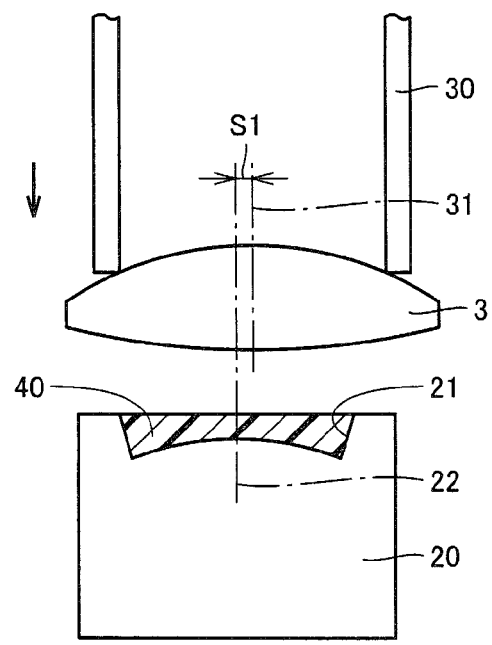
FIG. 14 is a cross-sectional view showing a step performed after the step shown in FIG. 13 in the present embodiment.
Figure 15:
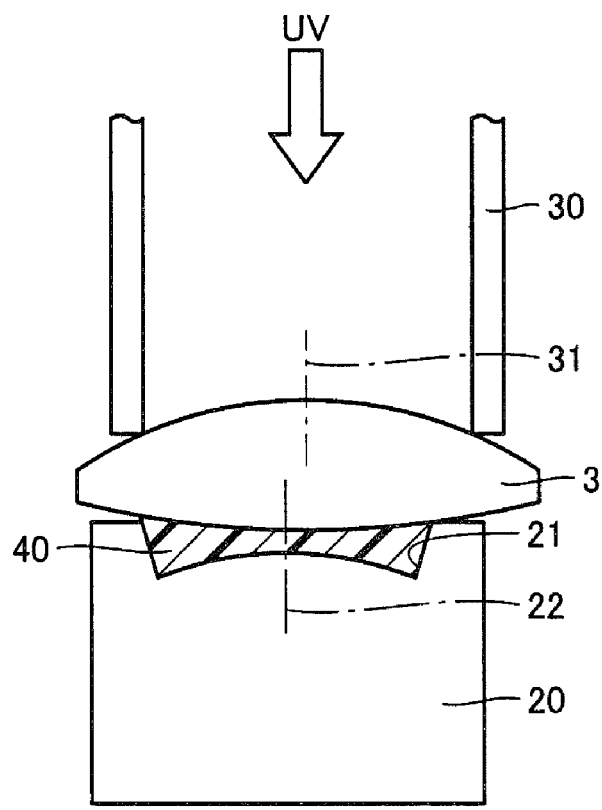
FIG. 15 is a cross-sectional view showing a step performed after the step shown in FIG. 14 in the present embodiment.
Figure 16:
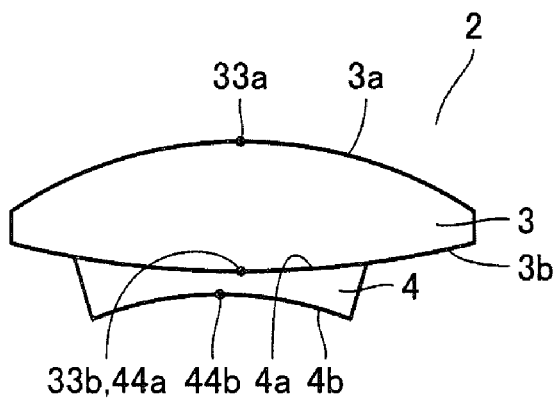
FIG. 16 is a cross-sectional view showing a step performed after the step shown in FIG. 15 in the present embodiment.

Next, as shown in FIG. 14, by obtained positional displacement amount S1, center axis 22 of mold 20 is slid relative to center axis 31 of lens holding portion 30. Next, ultraviolet-curing resin 40 is injected into concave portion 21 of mold 20. Next, lens holding portion 30 is lowered to place base member lens 3 on mold 20, allowing the output surface of base member lens 3 to contact resin 40. Next, as shown in FIG. 15, resin 40 is irradiated with ultraviolet rays and thereby cured. After resin 40 is cured, resin lens 4 is taken out of mold 20. Thus, as shown in FIG. 16, compound lens 2 in which resin lens 4 is bonded to base member lens 3 is completed.

Figure 17:
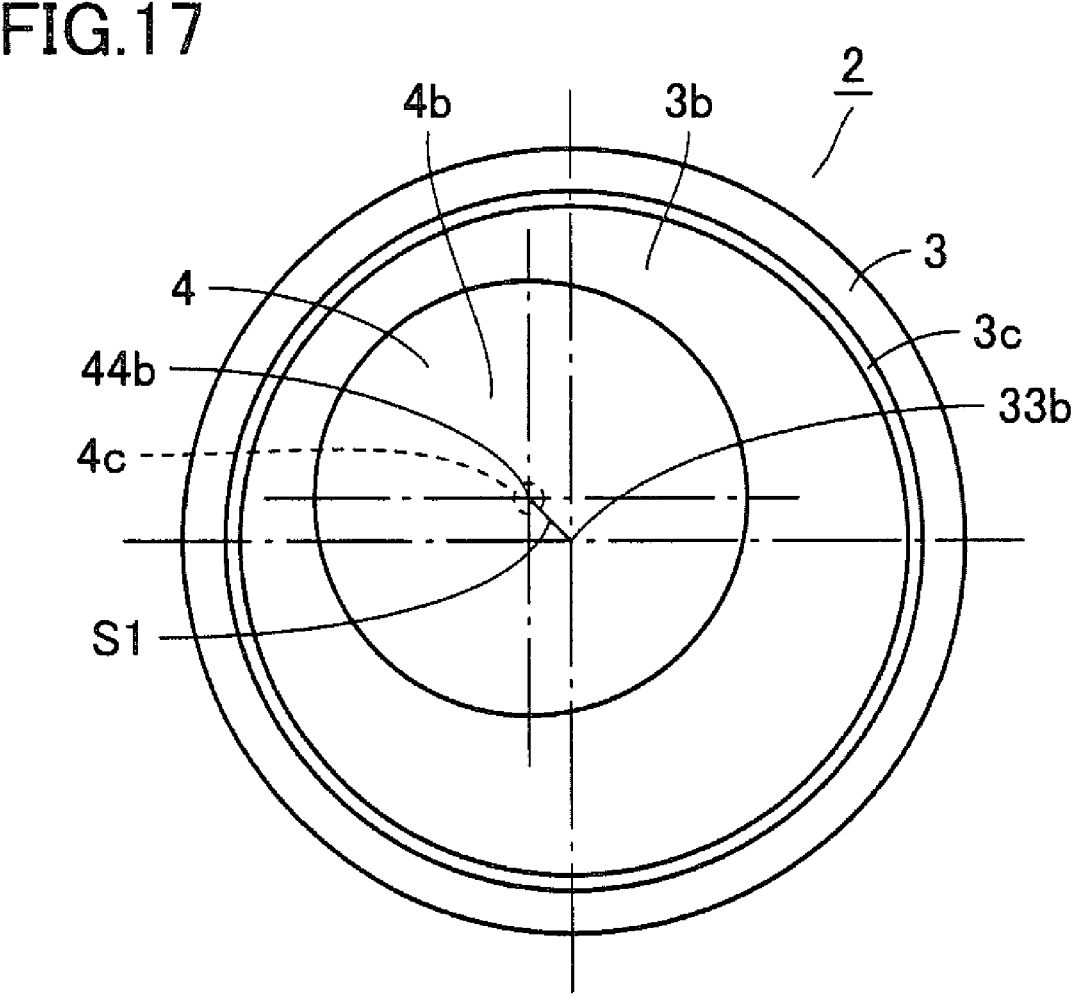
FIG. 17 is a plan view showing a step performed after the step shown in FIG. 16 in the present embodiment.

As shown in FIG. 17, in compound lens 2, output surface center 33b of base member lens 3 and output surface center 44b of resin lens 4 are displaced from each other by positional displacement amount S1, in consideration of tolerance (displacement SO) in molding and bonding resin lens 4 onto base member lens 3. It is to be noted that output surface center 33b of base member lens 3 and incident surface center 44a of resin lens 4 agree with each other.

Figure 18:
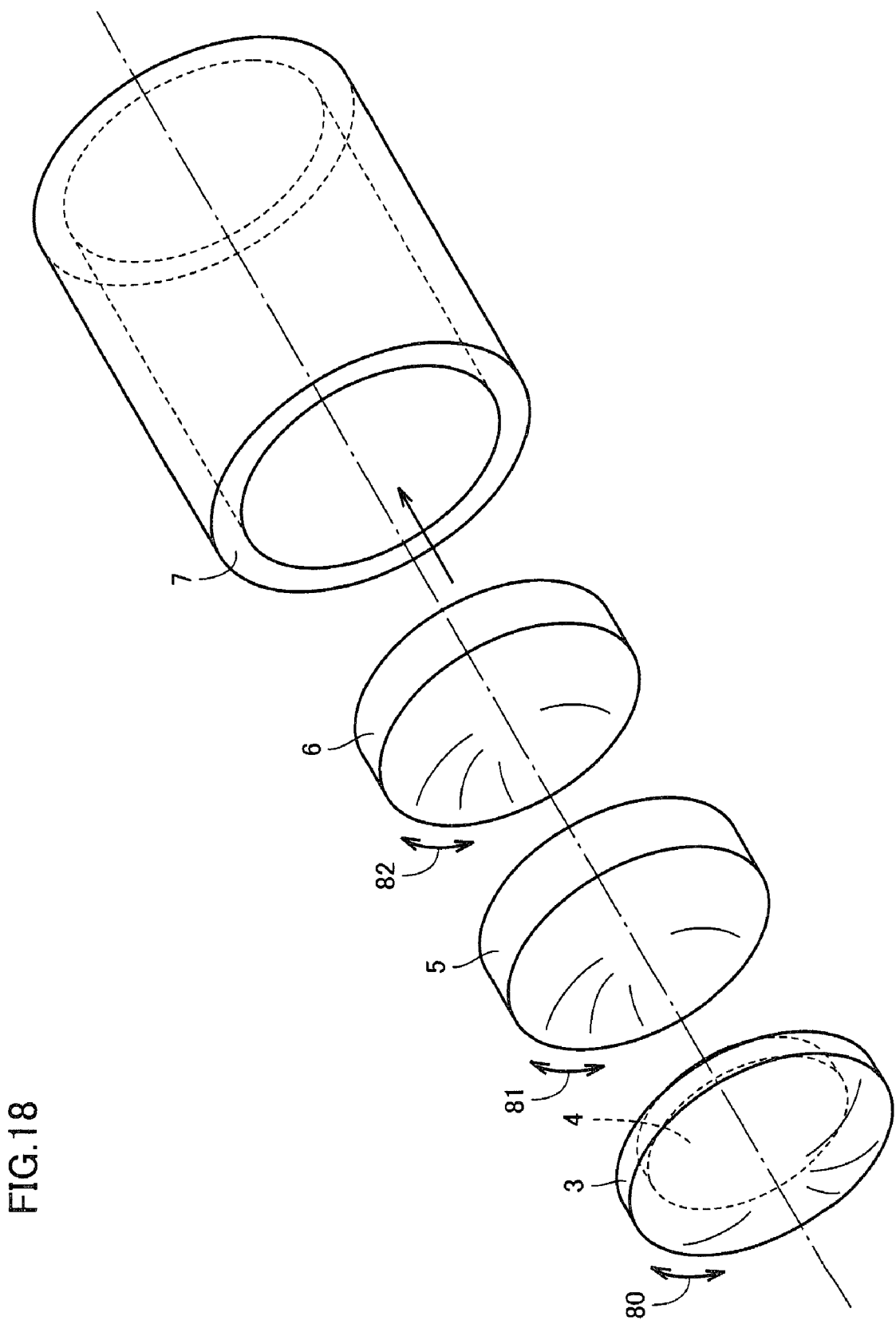
FIG. 18 is a perspective view showing a step performed after the step shown in FIG. 17 in the present embodiment.

Next, as shown in FIG. 18, compound lens 2 and single lenses 5, 6 are arranged in lens barrel 7. Here, they are arranged taking into consideration of respective circumferential direction positions (arrows 80-82) of compound lens 2 and single lenses 5, 6 obtained when calculating positional displacement amount T. Thus, as shown in FIG. 19, imaging lens 1 in which compound lens 2 and single lenses 5, 6 are arranged in lens barrel 7 as a plurality of lenses is completed.

In imaging lens 1, resin lens 4 is bonded to base member lens 3 having output surface center 44b of resin lens 4 displaced relative to output surface center 33b of base member lens 3 by a prescribed amount, so that a transmission decentration amount attributed to positional displacement amounts of the incident surface center and the output surface center relative to the contour center axis for each lens except for resin lens 4 (i.e., base member lens 3 and single lenses 5, 6) is cancelled by a transmission decentration amount by resin lens 4 when taken as a whole lens system.

Figure 19:
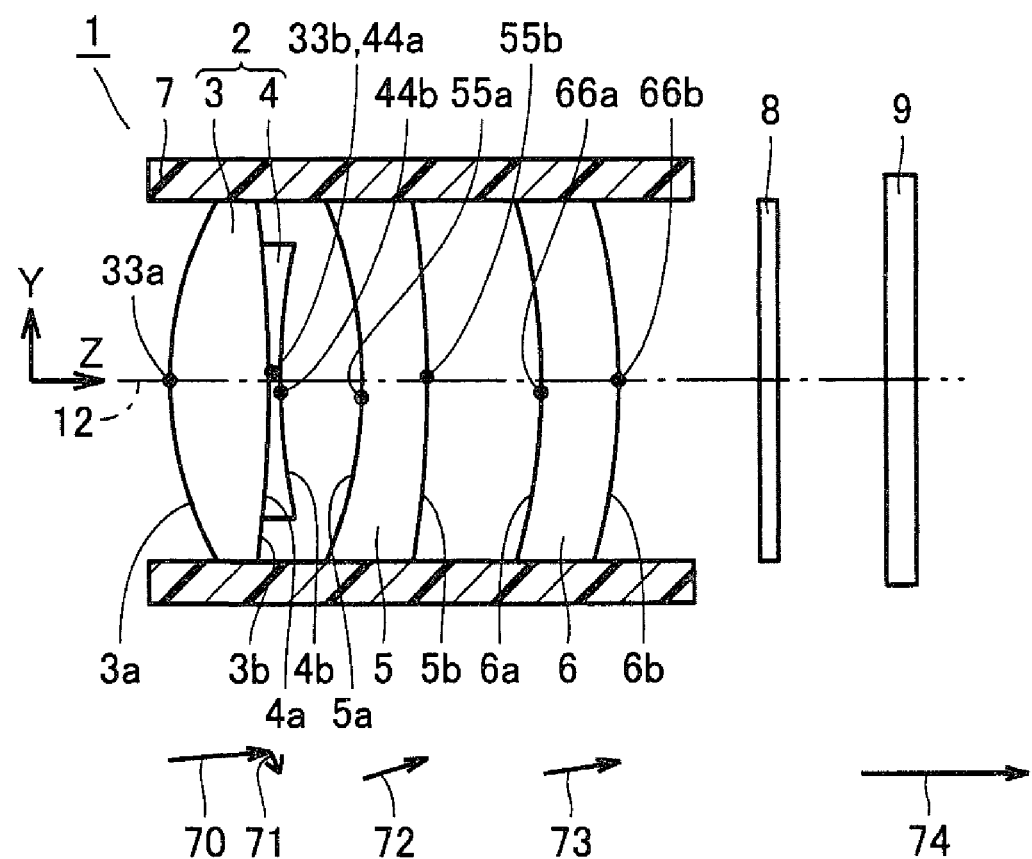
FIG. 19 is a cross-sectional view used for describing a transmission decentration amount in the imaging lens in the present embodiment.

Thus, as shown in FIG. 19, in a state where compound lens 2 and single lenses 5, 6 are assembled in lens barrel 7, even when there is transmission decentration in each of lenses 2, 5, 6, as shown by line 70 connecting incident surface center 33a and output surface center 33b of base member lens 3 of compound lens 2, line 72 connecting incident surface center 55a and output surface center 55b of single lens 5, and line 73 connecting incident surface center 66a and output surface center 66b of single lens 6, the transmission decentration amount is cancelled by the transmission decentration of resin lens 4 (line 71) when taken as a whole lens system.

Thus, as the transmission decentration by base member lens 3 and single lenses 5, 6 is cancelled by transmission decentration by resin lens 4 when taken as a whole lens system, the transmission decentration amount of imaging lens 1 can be minimized, as shown by line 74. Alternatively, the transmission decentration amount can be eliminated. As a result, the light transmitted through compound lens 2 and single lenses 5, 6 forms an image at imaging element 9 in an excellent manner, and reduction in resolving power or occurrence of blurs in half of the image can be prevented.

Second Embodiment

In the first embodiment, it has been described about a method of manufacturing an imaging lens based on a positional displacement amount of an incident surface center or an output surface center relative to a contour center axis of a lens. Here, a description is given about a method of manufacturing an imaging lens based on a positional displacement amount of an incident surface center or an output surface center relative to a barrel center axis in a state where the lenses except for a resin lens are arranged in a lens barrel.

Figure 20:
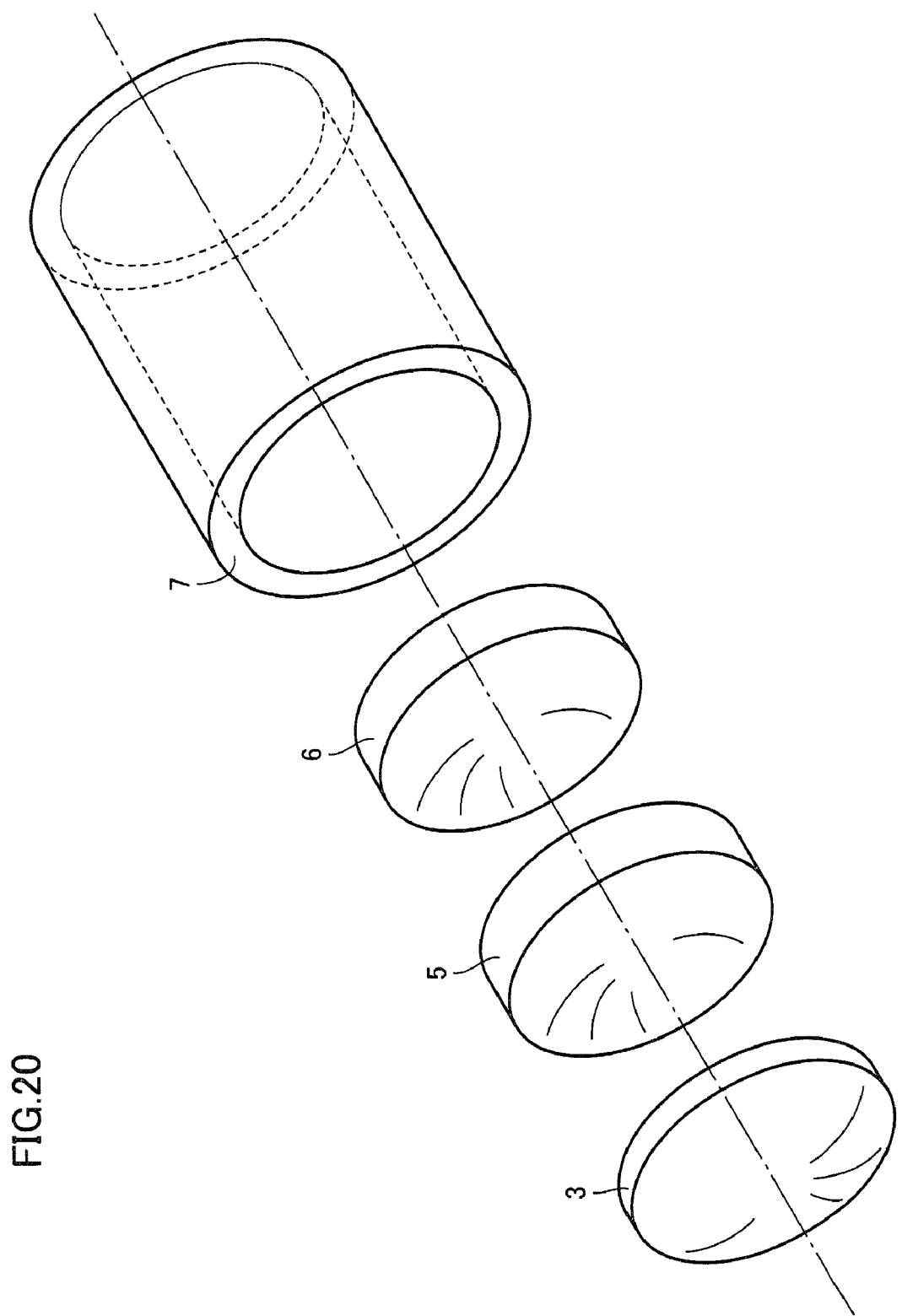
FIG. 20 is a perspective view showing one step in a manufacturing method of an imaging lens according to a second embodiment of the present invention.
Figure 21:
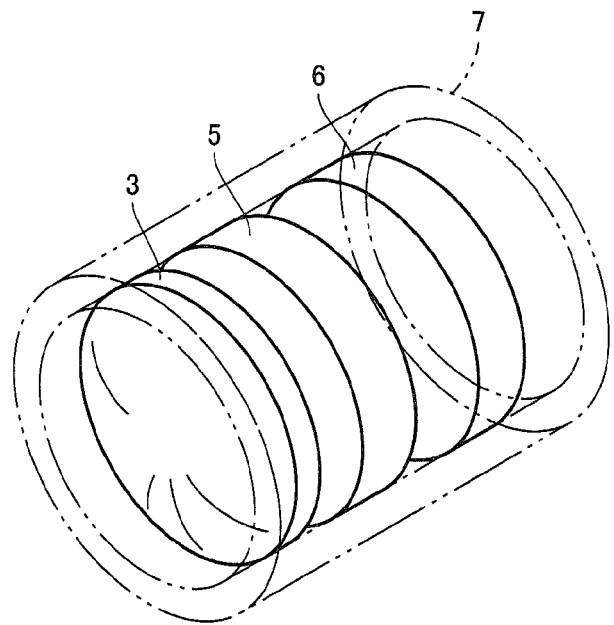
FIG. 21 is a perspective view showing a step performed after the step shown in FIG. 20 in the present embodiment.

First, as shown in FIGS. 20 and 21, base member lens 3 and single lenses 5, 6 are arranged in prescribed positions in lens barrel 7. Here, base member lens 3 and single lenses 5, 6 are arranged in a state where respective circumferential direction positions are aligned, for example by aligning the positions (not shown) corresponding to the gates when base member lens 3 and single lenses 5, 6 are molded.

Next, in a state where base member lens 3 and single lenses 5, 6 are arranged in lens barrel 7 (FIG. 21), a positional displacement amount for each of the incident surface center and the output surface center of each lens relative to barrel center axis 12 is measured using a decentration measuring device, for each of base member lens 3 and single lenses 5, 6. Now, the positional displacement amount is described in further detail.

Figure 22:
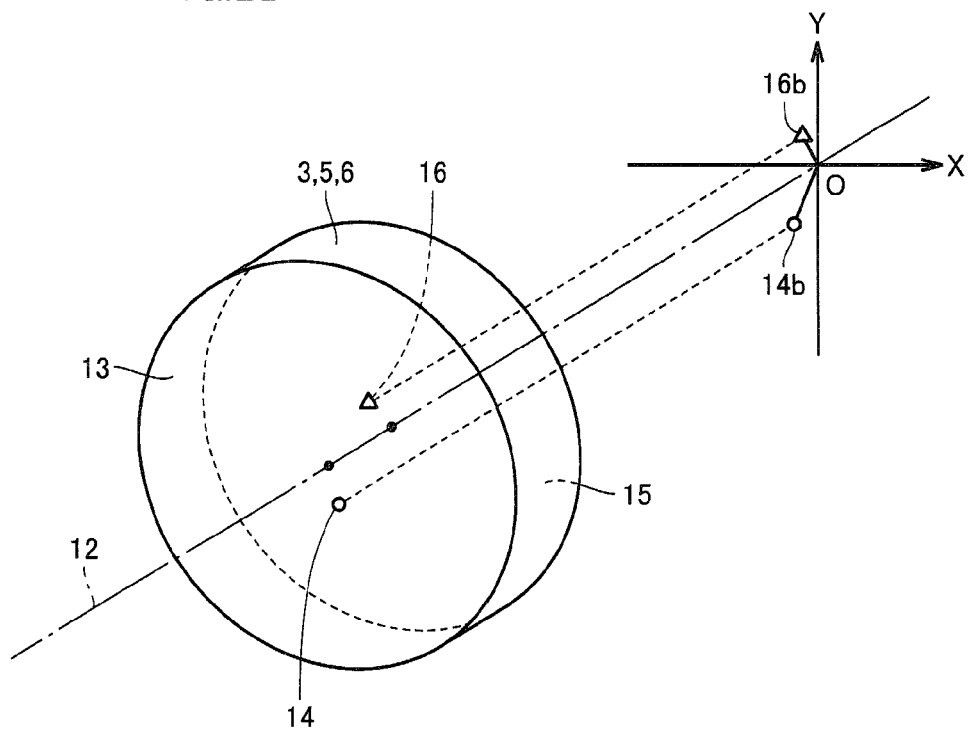
FIG. 22 is a perspective view used for describing a positional displacement amount of the incident surface center or the output surface center relative to a barrel center axis in the present embodiment.

An X-Y plane perpendicular to barrel center axis 12 as shown in FIG. 22 is discussed, in which a point at which barrel center axis 12 crosses the plane is origin O. Assuming that a position where a line passing incident surface center 14 and being parallel to barrel center axis 12 crosses the X-Y plane is position 14b, and a position where a line passing output surface center 16 and being parallel to barrel center axis 12 crosses the X-Y plane is position 16b, the positional displacement amount between incident surface center 14 and barrel center axis 12 can be obtained as the distance between position 14b and origin O. The positional displacement amount between output surface center 16 and barrel center axis 12 can be determined as the distance between origin O and position 16b.

Next, based on the respective obtained positional displacement amounts of incident surface center 14 and output surface center 16 of each of base member lens 3 and single lenses 5, 6 relative to barrel center axis 12, a transmission decentration amount in a state where base member lens 3 and single lenses 5, 6 are arranged in lens barrel 7 is obtained by an optical calculation.

Next, a positional displacement amount T (a distance in the X-Y plane) is calculated by an optical calculation. Positional displacement amount T is a positional displacement amount by which output plane center 44b of resin lens 4 is displaced relative to output surface center 33b of base member lens 3 so that the obtained transmission decentration amount is cancelled in a state where the resin lens is bonded to the base member lens and thereafter the resulting bonded compound lens 2 is arranged together with single lenses 5, 6 in lens barrel 7 (when taken as a whole lens system). Here, the circumferential direction position of each of compound lens 2 and single lenses 5, 6 is predetermined.

Next, a reference compound lens is produced according to the method as described above, and positional displacement amount SO of the center position of the lens surface of the reference compound lens is measured. Next, according to the method as described above, based on the obtained positional displacement amount SO, a positional displacement amount S2 by which center axis 22 of mold 20 and center axis 31 of lens holding portion 30 should actually be relatively displaced from each other is obtained, in order to attain the calculated positional displacement amount T.

Figure 23:
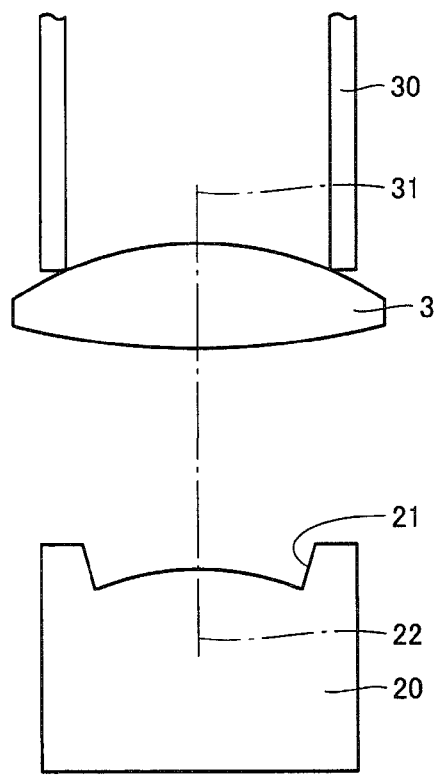
FIG. 23 is a cross-sectional view showing a step performed after the step shown in FIG. 21 in the present embodiment.

Next, based on the obtained positional displacement amount S2, a compound lens is produced. First, through the similar steps shown in FIGS. 4-7, as shown in FIG. 23, in a state where center axis 22 of mold 20 and center axis 31 of lens holding portion 30 agree with each other, base member lens 3 is held in a prescribed orientation relative to lens holding portion 30.

Figure 24:
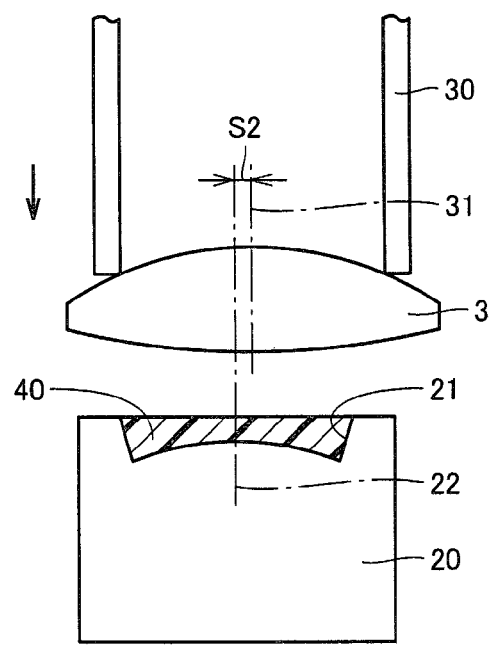
FIG. 24 is a cross-sectional view showing a step performed after the step shown in FIG. 23 in the present embodiment.

Next, as shown in FIG. 24, by obtained positional displacement amount S2, center axis 22 of mold 20 is slid relative to center axis 31 of lens holding portion 30. Next, ultraviolet-curing resin 40 is injected into concave portion 21 of mold 20. Next, lens holding portion 30 is lowered to place base member lens 3 on mold 20, allowing the a prescribed lens surface of base member lens 3 to contact resin 40.

Figure 25:
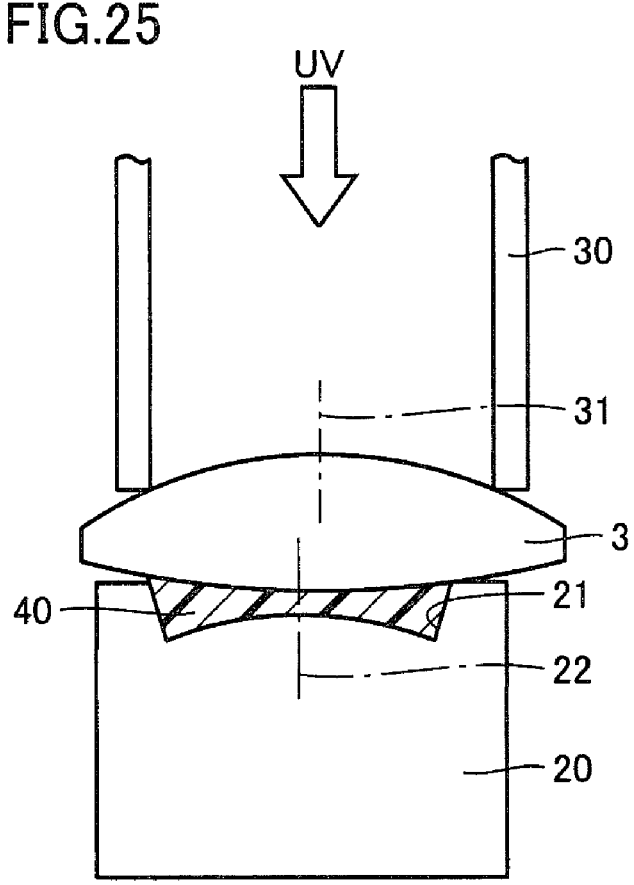
FIG. 25 is a cross-sectional view showing a step performed after the step shown in FIG. 24 in the present embodiment.
Figure 26:
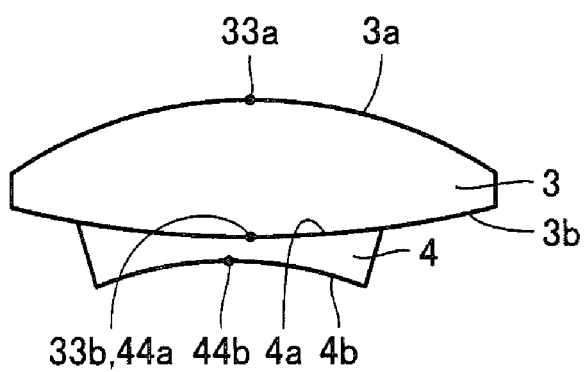
FIG. 26 is a cross-sectional view showing a step performed after the step shown in FIG. 25 in the present embodiment.

Next, as shown in FIG. 25, resin 40 is irradiated with ultraviolet rays and thereby cured. After resin 40 is cured, resin lens 4 is taken out of mold 20. Thus, as shown in FIG. 26, compound lens 2 in which resin lens 4 is bonded to base member lens 3 is completed. In compound lens 2, output surface center 33b of base member lens 3 and output surface center 44b of resin lens 4 are displaced from each other by positional displacement amount S2, in consideration of tolerance (displacement SO) in molding and bonding resin lens 4 to base member lens 3.

Figure 27:
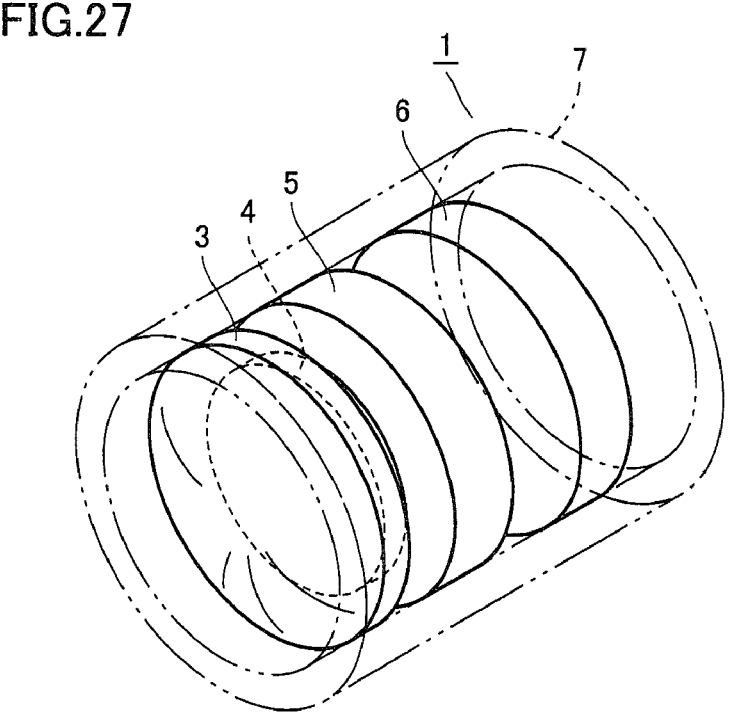
FIG. 27 is a perspective view showing a step performed after the step shown in FIG. 26 in the present embodiment.
Figure 28:
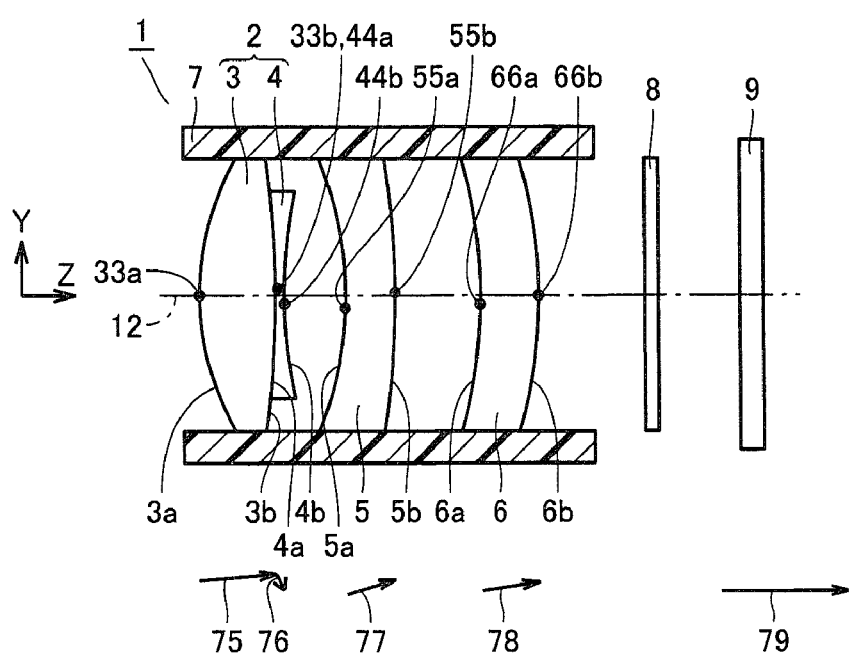
FIG. 28 is a cross-sectional view used for describing a transmission decentration amount in the imaging lens in the present embodiment.

Next, as shown in FIG. 27, compound lens 2 and single lenses 5, 6 are arranged in lens barrel 7. Here, as described above, compound lens 2 and single lenses 5, 6 are arranged so that their respective circumferential direction positions are aligned. Thus, as shown in FIG. 28, imaging lens 1 in which compound lens 2 and single lenses 5, 6 are arranged in lens barrel 7 as a plurality of lenses is completed.

In imaging lens 1 described above, resin lens 4 is bonded to base member lens 3 having output surface center 44b of resin lens 4 displaced relative to output surface center 33b of base member lens 3 by a prescribed amount, so that a transmission decentration amount attributed to positional displacement amounts of the incident surface center and the output surface center relative to barrel center axis 12 for each lens except for resin lens 4 (i.e., base member lens 3 and single lenses 5, 6) is cancelled by a transmission decentration amount by resin lens 4 when taken as a whole lens system.

Thus, as shown in FIG. 27, in a state where compound lens 2 and single lenses 5, 6 are assembled in lens barrel 7, even when there is transmission decentration in each of lenses 2, 5, 6, as shown by line 75 connecting incident surface center 33a and output surface center 33b of base member lens 3 of compound lens 2, line 77 connecting incident surface center 55a and output surface center 55b of single lens 5, and line 78 connecting incident surface center 66a and output surface center 66b of single lens 6, the transmission decentration (amount) is cancelled by the transmission decentration of resin lens 4 (line 76) when taken as a whole lens system.

By a simulation, it has been found that, for example when y-direction component of transmission decentration amount (line 75) by base member lens 3 is 1 μm, y-direction component of transmission decentration amount (line 77) by single lens 5 is 3 μm, and y-direction component of transmission decentration amount (line 78) by single lens 6 is 2 μm, by setting y-direction component of transmission decentration amount (line 76) by resin lens 4 to be −4 μm, the transmission decentration amount when taken as a whole lens system is eliminated.

Thus, as the transmission decentration by base member lens 3 and single lenses 5, 6 is cancelled by transmission decentration by resin lens 4 when taken as a whole lens system, the transmission decentration amount can be minimized as imaging lens 1, as shown by line 79. Alternatively, the transmission decentration amount can be eliminated. As a result, the light transmitted through compound lens 2 and single lenses 5, 6 forms an image at imaging element 9 in an excellent manner, and reduction in resolving power or occurrence of blurs in half of the image can be prevented.

Additionally, according to the manufacturing method described above, compound lens 2 and single lenses 5, 6 are arranged in lens barrel 7 with their respective circumferential direction positions aligned. Thus, as compared to a case where the circumferential direction positions are adjusted for arranging each of lenses 2, 5, 6, the assembly work can be performed efficiently, and the productivity can be improved.

In the above description, imaging lens 1 having one compound lens 2 and two single lenses 5, 6 has been exemplarily described. The imaging lens is not limited thereto, and the present invention is applicable to an imaging lens having at least one compound lens and at least one single lens.

Also, as to the sequence in manufacturing compound lens 2, it has been exemplarily described to hold base member lens 3 in a prescribed orientation by lens holding portion 30, then displace mold 20 by a prescribed amount relative to lens holding portion 30, and thereafter inject resin 40 into mold 20, and bond resin lens 4 to base member lens 3. As to the step of bonding resin lens 4 to base member lens 3, it is also possible to firstly displace mold 20 by a prescribed amount relative to lens holding portion 30, and thereafter holding base member lens 3 by lens holding portion 30 and bonding resin lens 4 thereto.

Third Embodiment

Figure 29:
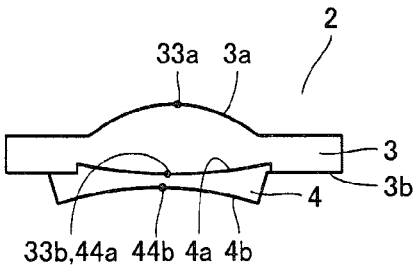
FIG. 29 is a cross-sectional view showing a compound lens according to a third embodiment of the present invention.

Now, a description is provided about the compound lens manufactured based on a positional displacement amount of an incident surface center, or an output surface center, relative to a contour center axis of the lens described in the first embodiment, and a method of manufacturing such a lens. As shown in FIG. 29, compound lens 2 is formed by base member lens 3 and resin lens 4. Resin lens 4 is bonded to output surface 3b of the base member lens. As base member lens 3, for example ZEONEX (registered trademark) from ZEON corporation, TOPAS (registered trademark) from Polyplastics Co., Ltd. can be employed. As resin lens 4, for example fluorine-based acrylate can be employed.

Figure 30:
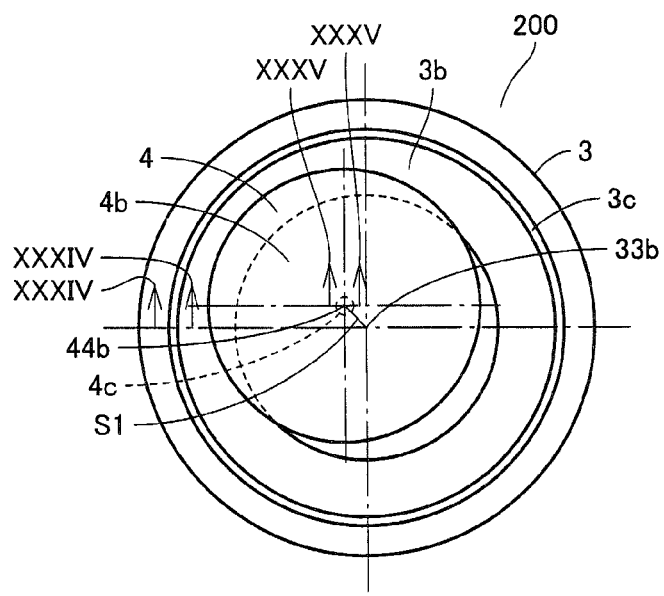
FIG. 30 is a plan view of the compound lens shown in FIG. 29 in the present embodiment.
Figure 31:
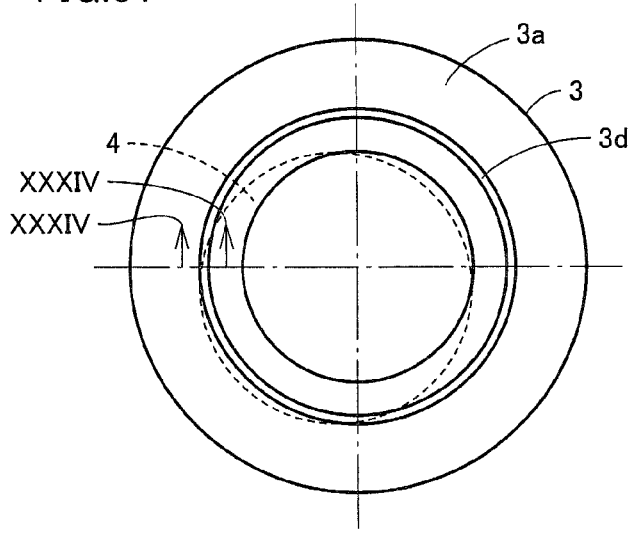
FIG. 31 is another plan view of the compound lens shown in FIG. 29 in the present embodiment.

As shown in FIGS. 30 and 31, in present compound lens 2, the center (output surface center 44b) position of the output-side lens surface (output surface 4b) of resin lens 4 and the center (output surface center 33b) position of output surface 3b of base member lens 3 are displaced by a prescribed amount S0 from each other, so that a transmission decentration amount attributed to base member lens 3, before having resin lens 4 bonded thereto, is cancelled by a transmission decentration amount by resin lens 4 in a state where resin lens 4 is bonded to base member lens 3 and thereafter the resulting bonded compound lens 2 is arranged in lens barrel 7 (see FIG. 1).

For measuring the positional displacement amount between base member lens 3 and resin lens 4, base member lens 3 is provided with a marker 3c at a surface (output surface 3b) where resin lens 4 is bonded, and a marker 3d at a surface (incident surface 3a) opposite to the surface where resin lens 4 is bonded. On the other hand, resin lens 4 is provided with a marker 4c at a surface (output surface 4b) where resin lens 4 is bonded. Marker 4c of resin lens 4 is easily formed by imprinting the grinding mark left in the mold to the resin lens.

Figure 32:
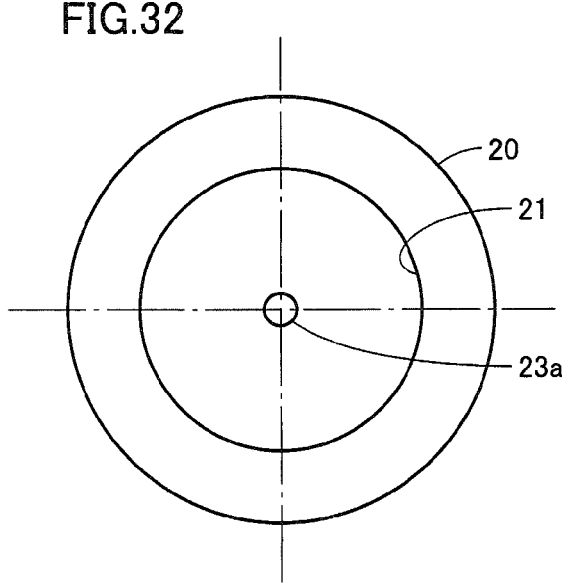
FIG. 32 is a top view used for describing a grinding mark of the mold in the present embodiment.
Figure 33:
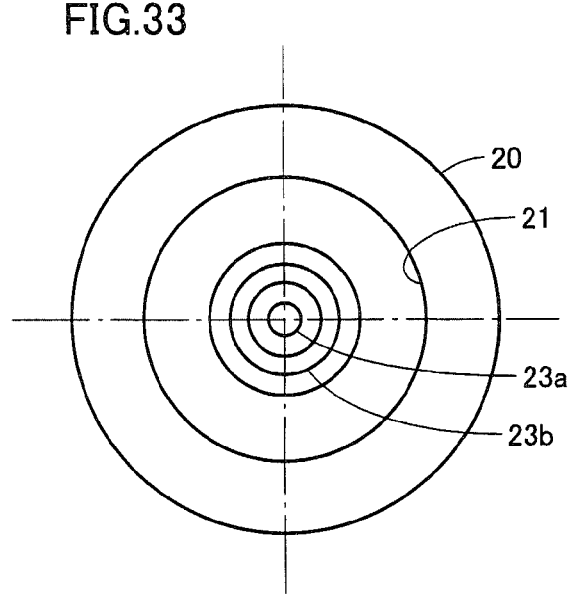
FIG. 33 is another top view used for describing a grinding mark of the mold in the present embodiment.
Figure 34:
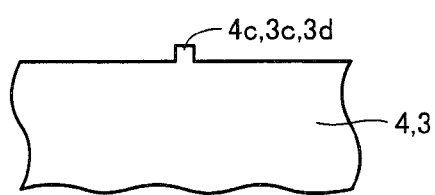
FIG. 34 is a partial cross-sectional view along a cross-section line XXXIV-XXXIV shown in FIGS. 30 and 31, or along a cross-section line XXXV-XXXV shown in FIG. 30, representing a cross-sectional shape of the marker in the present embodiment.
Figure 35:
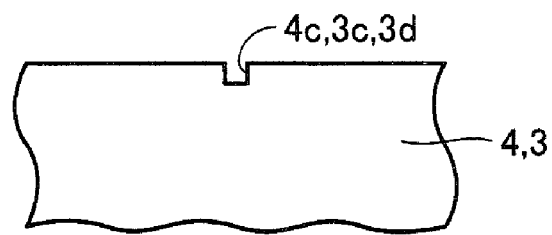
FIG. 35 is a partial cross-sectional view along a cross-section line XXXIV-XXXIV shown in FIGS. 30 and 31, or along a cross-section line XXXV-XXXV shown in FIG. 30, representing another cross-sectional shape of the marker in the present embodiment.

As shown in FIG. 32, as the grinding mark, a grinding mark 23a left at the center of the bottom of concave portion 21 when forming concave portion 21 in mold 20 by grinding can be utilized. Also, as shown in FIG. 33, grinding mark 23a left at the center of the bottom of concave portion 21 and a grinding mark 23b left around the center in a concentric manner can be utilized. The shape (cross section) of markers 3c, 3d, 4c may be convex (convex portion) as shown in FIG. 34, or it may be concave (concave portion) as shown in FIG. 35.

With resin lens 4 provided with concave marker 4c having, for example, a depth of 0.02 μm and a rectangular cross section, there was no effect by marker 4c on the optical performance. In order to avoid any effect by marker 4c on the optical performance, preferably concave marker 4c has a depth not more than 0.1 μm, and convex marker 4c has a height not more than 0.1 μm.

Next, an exemplary manufacturing method of the above-described compound lens is described. First, as described in the first embodiment, by using a decentration measuring device, a positional displacement amount for each of incident surface center 14 and output surface center 16 of base member lens 3 is measured. Based on the positional displacement amounts, a positional displacement amount T is calculated. Positional displacement amount T is a positional displacement amount by which output plane center 44b of resin lens 4 is displaced relative to output surface center 33b of base member lens 3 so that the transmission decentration amount attributed to base member lens 3 is cancelled in a state where resin lens 4 is bonded to base member lens 3 and thereafter the resulting bonded compound lens 2 is arranged in a lens barrel (when taken as a whole lens system). A reference compound lens is produced, and a positional displacement amount SO between the output surface center of the base member lens and the output surface center of the resin lens is measured as a manufacture tolerance (see FIG. 12).

Figure 36:
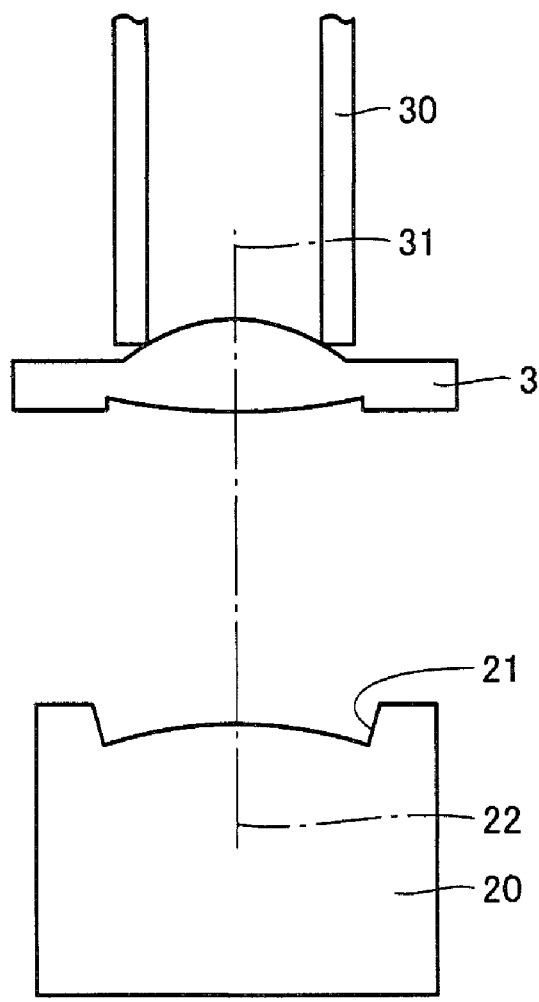
FIG. 36 is a cross-sectional view showing one step of manufacturing method of the compound lens in the present embodiment.
Figure 37:
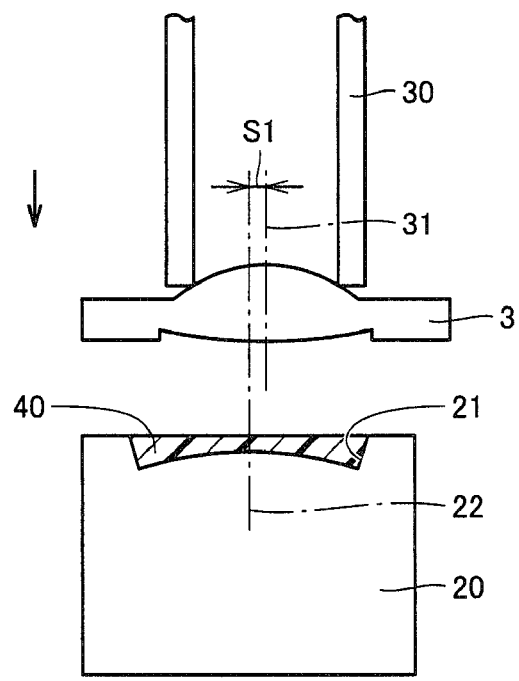
FIG. 37 is a cross-sectional view showing a step performed after the step shown in FIG. 36 in the present embodiment.

Next, based on calculated positional displacement amount T and measured positional displacement amount SO, a positional displacement amount S1 by which center axis 22 of mold 20 and lens holding portion 31 should actually be relatively displaced from each other is obtained. Next, through the similar steps shown in FIGS. 4-7, as shown in FIG. 36, in a state where center axis 22 of mold 20 and center axis 31 of lens holding portion 30 agree with each other, base member lens 3 is held in a prescribed orientation relative to lens holding portion 30. Next, as shown in FIG. 37, by obtained positional displacement amount S1, center axis 22 of mold 20 is slid relative to center axis 31 of lens holding portion 30.

Figure 38:
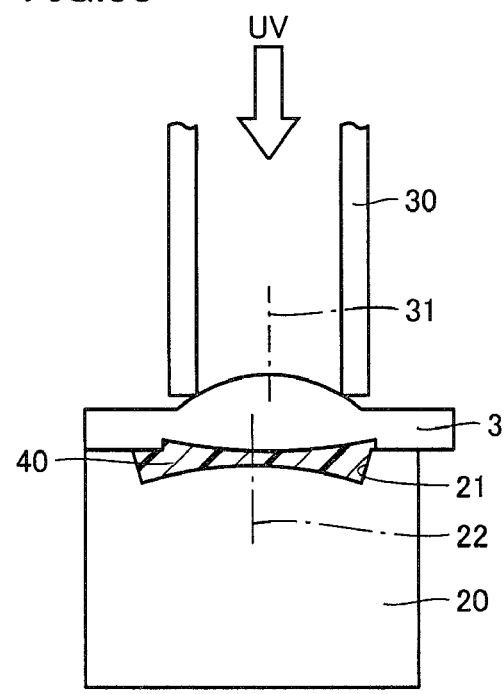
FIG. 38 is a cross-sectional view showing a step performed after the step shown in FIG. 37 in the present embodiment.
Figure 39:
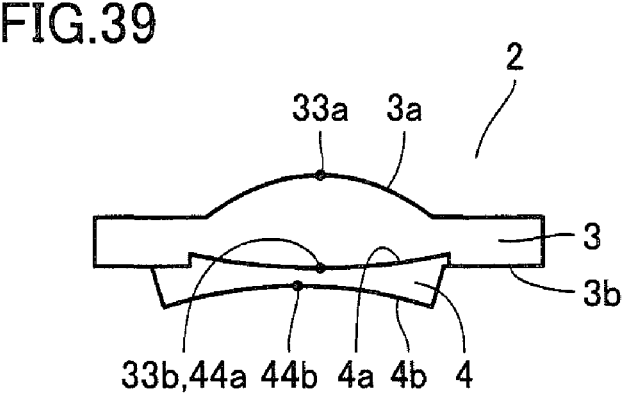
FIG. 39 is a cross-sectional view showing a step performed after the step shown in FIG. 38 in the present embodiment.
Figure 40:
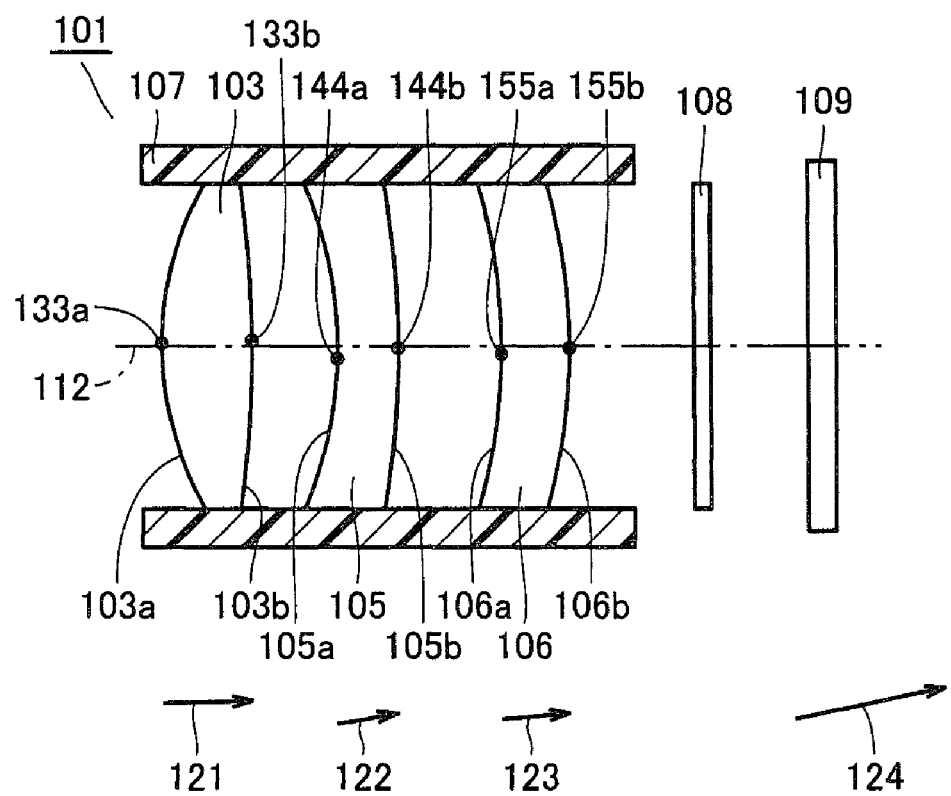
FIG. 40 is a cross-sectional view showing a conventional imaging lens.

Next, ultraviolet-curing resin 40 is injected into concave portion 21 of mold 20. Next, lens holding portion 30 is lowered to place base member lens 3 on mold 20, allowing the output surface of base member lens 3 to contact resin 40. Next, as shown in FIG. 38, resin 40 is irradiated with ultraviolet rays and thereby cured. After resin 40 is cured, resin lens 4 is taken out of mold 20. Thus, as shown in FIG. 39, compound lens 2 in which resin lens 4 is bonded to base member lens 3 is completed.

In compound lens 2, resin lens 4 is bonded to base member lens 3 having output surface center 44b of resin lens 4 displaced relative to output surface center 33b of base member lens 3 by a prescribed amount, so that a transmission decentration amount attributed to positional displacement amounts of the incident surface center and the output surface center of base member lens 3 relative to the contour center axis is cancelled by a transmission decentration amount by resin lens 4 when taken as a whole lens system. Thus, even when there is transmission decentration in base member lens 3, the transmission decentration amount is cancelled by the transmission decentration by resin lens 4 when taken as a whole lens system (see FIG. 19). As a result, the light transmitted through compound lens 2 forms an image at the imaging element in an excellent manner, and reduction in resolving power or occurrence of blurs in half of the image can be prevented.

Base member lens 3 is provided with markers 3c, 3d, and resin lens 4 is provided with marker 4c (see FIGS. 30 and 31). Thus, when displacing output surface center 44b of resin lens 4 relative to output surface center 33b of base member lens 3, it can be displaced easily just by a prescribed amount, using the positional displacement amount obtained by markers 3c, 3d, 4c of the prototype compound lens.

Marker 3c formed on base member lens 3 is formed on the surface to which resin lens 4 is bonded (output surface 3b), while marker 3d is formed on the surface opposite thereto (incident surface 3a). Thus, not only a displacement amount (displacement amount A) between output surface center 33b of output surface 3b of base member lens 3 and output surface center 44b of output surface 4b of resin lens 4, but also a displacement amount (displacement amount B) between incident surface center 33a of incident surface 3a of base member lens 3 and output surface center 44b of output surface 4b of resin lens 4 can be measured.

In a compound lens in which a resin lens is bonded to the output surface of a base member lens in which the radius of curvature of the incident surface (on the object side) is sufficiently smaller than that of the output surface (on the image side), the optical performance of the compound lens is affected by displacement amount B rather than by displacement amount A. Accordingly, formation of marker 3d on incident surface 3a of base member lens 3 allows displacement amount B to easily be measured, and contributes to an improvement in the optical performance.

It is to be noted that, while compound lens 2 has been exemplary described to be manufactured based on the contour center axis, it can also be manufactured based on the barrel center axis (the second embodiment). In each of the embodiments, while the compound lens has been exemplary described to be formed by bonding the resin lens to the output surface of the base member lens, the resin lens can be bonded to the incident surface of the base member lens. Further, the cross-sectional shape of the marker is not limited to a rectangle, and may be, for example, triangle, pentagon or the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An imaging lens having a plurality of lenses, comprising:
    a first lens in which a resin lens is bonded to a base member lens;
    a second lens arranged according to a prescribed positional relationship of said first lens; and
    a lens barrel in which said first lens and said second lens are arranged, wherein where a contour center axis is an axis passing through the center of circles along respective contours of said base member lens, said resin lens, and said second lens, where a barrel center axis is an axis passing through the center of said lens barrel, where one of said contour center axis and said barrel center axis is a prescribed center axis, where a first transmission decentration amount is a positional displacement amount, with respect to an optical axis, of a position where an image is formed by light transmitted through said base member lens before having said resin lens bonded to the base member lens and through said second lens, attributed to a positional displacement amount, with respect to said prescribed center axis, of an incident surface center and an output surface center of said base member lens before having said resin lens bonded to the base member lens and attributed to a positional displacement amount, with respect to said prescribed center axis, of an incident surface center and an output surface center of said second lens, and where a second transmission decentration amount is a positional displacement amount, with respect to said optical axis, of a position where an image is formed by light transmitted through said resin lens, attributed to a positional displacement amount, with respect to said prescribed center axis, of an incident surface center and an output surface center of said resin lens, in said first lens, said resin lens is bonded to said base member lens, having said output surface center of said resin lens and said output surface center of said base member lens displaced from each other by a prescribed amount, so that said first transmission decentration amount is cancelled by said second transmission decentration amount when taken as a whole lens system including said first lens and said second lens.

2. The imaging lens according to claim 1, wherein
said resin lens is provided with a prescribed first marker around said output surface center of said resin lens, and
the first marker is used to measure a positional displacement amount between a surface center of the base member lens and a surface center of the resin lens under a state where the base member lens and the resin lens are bonded, based on a positional displacement amount between the surface center of said base member lens and said prescribed center axis and a positional displacement amount between the surface center of said resin lens and said prescribed center axis, and said first marker is formed of the same material as the resin lens and exposed at a surface of the first lens.

3. The imaging lens according to claim 2, wherein
said first marker is an annular convex or concave portion.

4. The imaging lens according to claim 1, wherein
said base member lens is provided with a prescribed second marker around said output surface center of said base member lens and
the second marker is used to measure a positional displacement amount between a surface center of the base member lens and a surface center of the resin lens under a state where the base member lens and the resin lens are bonded, based on a positional displacement amount between the surface center of said base member lens and said prescribed center axis and a positional displacement amount between the surface center of said resin lens and said prescribed center axis, and said second marker is formed of the same material as the base member lens and exposed at a surface of the first lens.

5. The imaging lens according to claim 4, wherein
said second marker is an annular convex or concave portion.

6. A manufacturing method of an imaging lens having at least a first lens and a second lens arranged in a lens barrel, said first lens being formed by bonding a resin lens to a base member lens, where a contour center axis is an axis passing through the center of circles along respective contours of said base member lens, said resin lens, and said second lens, where a barrel center axis is an axis passing through the center of said lens barrel, where one of said contour center axis and said barrel center axis is a prescribed center axis, where a first transmission decentration amount is a positional displacement amount, with respect to an optical axis, of a position where an image is formed by light transmitted through said base member lens before having said resin lens bonded to the base member lens and through said second lens, attributed to a positional displacement amount, with respect to said prescribed center axis, of an incident surface center and an output surface center of said base member lens before having said resin lens bonded to the base member lens and attributed to a positional displacement amount, with respect to said prescribed center axis, of an incident surface center and an output surface center of said second lens, and where a second transmission decentration amount is a positional displacement amount, with respect to said optical axis, of a position where an image is formed by light transmitted through said resin lens, attributed to a positional displacement amount, with respect to said prescribed center axis, of an incident surface center and an output surface center of said resin lens, said method comprising the steps of:

obtaining a prescribed positional displacement amount between said output surface center of said resin lens and said output surface center of said base member lens, so that said first transmission decentration amount is cancelled by said second transmission decentration amount when taken as a whole lens system including said first lens and said second lens;

forming said first lens by bonding said resin lens to an output surface of said base member lens based on the obtained prescribed positional displacement amount; and arranging said first lens and said second lens according to a prescribed positional relationship.

7. The manufacturing method of the imaging lens according to claim 6, wherein
in said step of obtaining the prescribed positional displacement amount, the prescribed positional displacement amount is obtained based on a positional displacement amount for each of the incident surface center and the output surface center of each of said base member lens and said second lens relative to said prescribed center axis which is said contour center axis.

8. The manufacturing method of the imaging lens according to claim 6, wherein
in said step of obtaining the prescribed positional displacement amount, a transmission decentration amount in a state where said base member lens and said second lens are arranged in said lens barrel is obtained, relative to said prescribed center axis which is said barrel center axis, and the prescribed positional displacement amount is obtained so that the obtained transmission decentration amount is cancelled.

9. The manufacturing method of the imaging lens according to claim 6, wherein
in said step of forming said first lens, a lens holding portion for holding said base member lens and a mold for molding said resin lens are relatively displaced from each other in a horizontal direction based on the obtained positional displacement amount, and said resin lens is bonded to the output surface of said base member lens.

10. The manufacturing method of the imaging lens according to claim 9, wherein said step of forming said first lens includes the steps of:
holding said base member lens in a prescribed orientation relative to said lens holding portion;
after relatively displacing said lens holding portion and said mold from each other in the horizontal direction, injecting resin to be said resin lens into said mold;
placing said base member lens, held by said lens holding portion in a state where a relative positional relationship in the horizontal direction is maintained, on said mold and allowing said base member lens to contact said resin; and
bonding said resin lens to said base member lens by curing said resin.

11. The manufacturing method of the imaging lens according to claim 9, wherein said step of forming said first lens includes the steps of:
relatively displacing said lens holding portion and said mold from each other in the horizontal direction, and injecting resin to be said resin lens into said mold;
placing said base member lens on said mold and allowing said base member lens to contact said resin;
holding said base member lens in a prescribed orientation by said lens holding portion; and
bonding said resin lens to said base member lens by curing said resin.

12. The manufacturing method of the imaging lens according to claim 6, wherein resin of ultraviolet-curing type is employed as said resin,
in said step of forming said first lens, said resin is cured by irradiating said resin with ultraviolet rays.

13. A compound lens in which a resin lens is bonded to a base member lens, comprising:

the resin lens having a first incident surface and a first output surface, a prescribed first marker being formed on at least one surface of said first incident surface and said first output surface;
the base member lens having a second incident surface and a second output surface and having said resin lens bonded to the base member lens, a prescribed second marker being formed on at least one surface of said second incident surface and said second output surface; and
a lens barrel in which said base member lens to which said resin lens is bonded is arranged, wherein
where a contour center axis is an axis passing through the center of circles along respective contours of said base member lens and said resin lens,
where a barrel center axis is an axis passing through the center of said lens barrel, and
where one of said contour center axis and said barrel center axis is a prescribed center axis
the prescribed first marker is used to measure a positional displacement amount between a surface center of the base member lens and a surface center of the resin lens under a state where the base member lens and the resin lens are bonded, based on a positional displacement amount between the surface center of said base member lens and said prescribed center axis and a positional displacement amount between the surface center of said resin lens and said prescribed center axis and the prescribed first marker is formed of the same material as said resin lens;
the prescribed second marker is used to measure a positional displacement amount between a surface center of the base member lens and a surface center of the resin lens under a state where the base member lens and the resin lens are bonded, based on a positional displacement amount between the surface center of said base member lens and said prescribed center axis and a positional displacement amount between the surface center of said resin lens and said prescribed center axis, and the prescribed second marker is formed of the same material as said base member lens and
the prescribed first marker and the prescribed second marker are both exposed on a surface of the compound lens.

14. The compound lens according to claim 13, wherein said first marker is formed at a center of said one surface, or around the center of said one surface, of said resin lens.

15. The compound lens according to claim 13, wherein said first marker is an annular convex or concave portion.

16. The compound lens according to claim 13, wherein said second marker is formed around the center of said at least one surface of said base member lens.

17. The compound lens according to claim 13, wherein said second marker is an annular convex or concave portion.

* * * * *